United States Patent
Gupta et al.

(10) Patent No.: US 10,346,269 B2
(45) Date of Patent: Jul. 9, 2019

(54) SELECTIVE MIRRORING OF PREDICTIVELY ISOLATED MEMORY

(71) Applicant: INTERNATIONAL BUSINESS MACHINES CORPORATION, Armonk, NY (US)

(72) Inventors: Sachin Gupta, Bangalore (IN); Prem Shanker Jha, Bangalore (IN); Venkatesh Sainath, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/107,488

(22) Filed: Aug. 21, 2018

(65) Prior Publication Data

US 2018/0357137 A1 Dec. 13, 2018

Related U.S. Application Data

(63) Continuation of application No. 15/244,105, filed on Aug. 23, 2016, now Pat. No. 10,082,981.

(51) Int. Cl.
*G06F 3/06* (2006.01)
*G06F 11/14* (2006.01)
(Continued)

(52) U.S. Cl.
CPC .......... *G06F 11/1666* (2013.01); *G06F 3/065* (2013.01); *G06F 3/0619* (2013.01); *G06F 3/0632* (2013.01); *G06F 3/0653* (2013.01); *G06F 3/0683* (2013.01); *G06F 11/142* (2013.01); *G06F 12/00* (2013.01); *G06F 11/20* (2013.01)

(58) Field of Classification Search
None
See application file for complete search history.

(56) References Cited

U.S. PATENT DOCUMENTS 8,099,570 B2 * 1/2012 O'Connor ........... G06F 11/1076
711/162
8,732,476 B1 5/2014 Van
(Continued)

FOREIGN PATENT DOCUMENTS

CN 103095691 A 5/2013
WO 2013113177 A1 8/2013

OTHER PUBLICATIONS

IBM: List of IBM Patents or Patent Applications Treated as Related (Appendix P), Oct. 12, 2018, pp. 1-2.

*Primary Examiner* — Denise Tran
(74) *Attorney, Agent, or Firm* — Michael O'Keefe

(57) ABSTRACT

A method, computer program product, and system for selective memory mirroring including identifying, by a computer during an initial program load, predictively deconfigured memory units and memory interfaces, wherein the predictively deconfigured memory units and memory interfaces are marked by the computer for removal from a computer configuration prior to the initial program load, analyzing the predictively deconfigured memory units and memory interfaces to determine a level of granularity for selective memory mirroring and initiating selective memory mirroring at the determined level of granularity using the analyzed predictively deconfigured memory units and memory interfaces.

12 Claims, 3 Drawing Sheets

(51) Int. Cl.
*G06F 11/16* (2006.01)
*G06F 12/00* (2006.01)
*G06F 11/20* (2006.01)

(56) References Cited

U.S. PATENT DOCUMENTS

| | | | |
|---|---|---|---|
| 10,082,981 B2* | 9/2018 | Gupta | ................... G06F 11/142 |
| 2009/0216985 A1 | 8/2009 | O'Connor et al. | |
| 2013/0151767 A1 | 6/2013 | Berke et al. | |
| 2014/0201314 A1* | 7/2014 | Borkenhagen | ...... G06F 11/1666 |
| | | | 709/216 |
| 2018/0059950 A1 | 3/2018 | Gupta et al. | |

* cited by examiner

SELECTIVE MIRRORING OF PREDICTIVELY ISOLATED MEMORY

BACKGROUND

The present invention relates generally to a method, system, and computer program product for mirroring in a server, and more particularly to a method, system, and computer program product for selective enablement of mirroring in a server.

Reliability, availability and serviceability (RAS) are important for a server, which is a computer or computer program which manages access to a centralized resource or service in a network. To achieve reliability and availability, hardware redundancies or spares may be incorporated at various levels of the server. When there is a failure in the server or system, a spare may be deployed seamlessly by either the hardware, for example at a semiconductor level, by a hypervisor or by firmware. The hardware may include memory components such as DRAMs (dynamic random-access memory), dual-in-line memory modules (DIMMs), wires and other components. The hypervisor, or virtual machine manager, is firmware or a program which works as if there are multiple computers on the server or system, and the hypervisor allows multiple operating systems to share a single hardware host, where each operating system appears to have the host's processor, memory and other resources. As a result of the deployment of the spare, applications or programs running on the system may not be impacted by a failure.

SUMMARY

According to an embodiment of the present invention a method, computer program product, and system for selective mirroring in a server is provided. The method, computer program product and system may include identifying, by a computer during an initial program load, predictively deconfigured memory units and memory interfaces, wherein the predictively deconfigured memory units and memory interfaces are marked by the computer for removal from a computer configuration prior to the initial program load, analyzing the predictively deconfigured memory units and memory interfaces to determine a level of granularity for selective memory mirroring and initiating selective memory mirroring at the determined level of granularity using the analyzed predictively deconfigured memory units and memory interfaces.

BRIEF DESCRIPTION OF THE DRAWINGS

The following detailed description, given by way of example and not intended to limit the invention solely thereto, will best be appreciated in conjunction with the accompanying drawings, in which.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Figure 1:
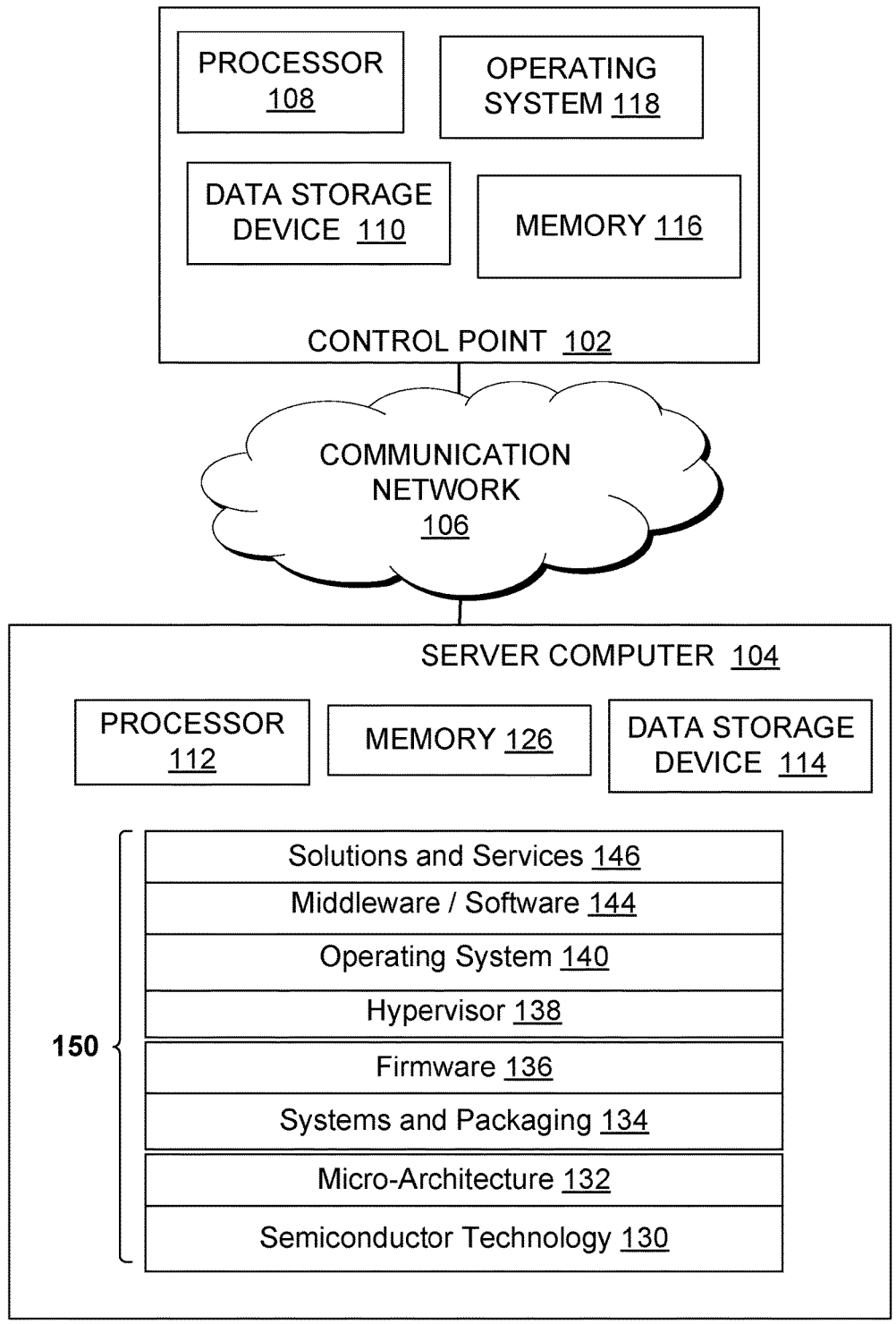
FIG. 1 is a functional block diagram illustrating a control point and a server computer, in accordance with an embodiment of the present invention.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the interest of not obscuring the presentation of embodiments of the present invention, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is rather focused on the distinctive features or elements of various embodiments of the present invention.

The present invention generally relates to a method, computer program product, and system for selective mirroring in a server. A method to set up selective mirroring in a server is to create redundancies for programs and applications which normally do not have redundant memory. Selective mirroring can be configured using memory which is not in use, such as memory not in use due to a structure of the system memory and also due to RAS techniques. An example of memory not in use may be predictively garded memory. Predictive garding is an RAS technology where the firmware identifies hardware which has potential problems, errors or failures, and the firmware creates predictive gard records of the identified hardware. The hardware with potential problems may include memory. The hardware with potential problems may not have shown definite signs of problems and may function appropriately during a current system session, however there is a risk of future problems and a further error can disrupt system operation. The hardware with potential problems may be removed from future configurations of the system during the next initial product load, or over time by the firmware or hypervisor. Selective mirroring may help improve the RAS and performance of the system by making available memory that otherwise would not be used because it is predictively garded. An embodiment by which to do selective mirroring is described in detail below by referring to the accompanying drawings in FIGS. 1 to 3. Those skilled in the art will readily appreciate that the detailed description given herein with respect to these figures is for explanatory purposes as the invention extends beyond these limited embodiments.

The method of recovering the potentially bad parts of the computer system while maintaining the reliability of the computer system may be done by utilizing predictively deconfigured hardware parts of memory of the computer system. Potentially bad parts include the parts which have reported some issues as well as parts which are declared bad because of association with other bad parts due to computer system configuration. The method proposes to utilize memory which is not currently being used. The memory which is not currently being used may be put to a new use to help improve reliability of the system. For example, a new use of the memory may be to employ memory mirroring of a program which normally do not use redundancy, which may improve the reliability of the program. An embodiment may include a technique to identify available hardware parts and determine a level of granularity possible from the available de-configured parts for efficient implementation of memory mirroring e.g. mirroring at DIMM level, memory buffer level etc. The method also includes an ability to disable this feature or make it optional. Proposed method can be used both at the time of system boot time as well as at run time.

Reliability, availability and serviceability (RAS) policies for a memory subsystem may be more stringent than RAS policies for a processor subsystem, because a failure in memory may corrupt customer data, and may cause an unscheduled interruption in services.

In order to improve reliability, servers may provide redundancy in memory groups, including spare lanes and spare DRAMS in a DIMM. A Direct Management Interface (DMI) may include a set of wires between a processor and memory, and may have spare wires or spare lanes. A spare lane is a spare wire at a hardware level that can be controlled by software.

Redundancies in a DIMM may include a spare DRAM, chip mark, and symbol mark, among others. For example, if there are 4 DIMMS connected to an asynchronous memory buffer (MBA), each DIMM may have 4 ranks, and each rank may have 16 DRAMs including a spare DRAM. The spare DRAM may be used as a substitute component if one of the 15 DRAM in use has been identified as a failing DRAM, or if one of the 15 DRAM in use has a high likelihood of failure. A failure or an errors may be correctable or temporary, or may be unrecoverable.

A hardware strategy may be used by the firmware to identify memory components which have a high probability of being a failing memory component. An example of a hardware redundancy strategy is chip mark, which is a strategy used by hardware or firmware to identify a group of chips or components which contain a component, for example a DRAM or DIMM, which has a high probability of failure. A further example of a hardware redundancy strategy is symbol mark, an identification that one component in a group of components has a high probability of being a failing component.

The number of spare, redundant, or backup components, and the use of hardware redundancy strategies can vary depending upon architecture of the system. For example, a DIMM may have one spare DRAM but may not use symbol mark. If the hardware or firmware detects an error, a spare component may get deployed. During runtime, once any available spares are used as substitute components, there is a chance of customer outage if additional errors or fails are reported.

The use of these methods to improve RAS may be controlled by a system administrator via settings of the system or can be run automatically by the system, depending upon a configuration policy.

An additional method to maintain reliability may be performed by the firmware. In a situation where all available spares may be in use, and a potential additional failure is identified, the firmware may predictively gard the memory at an appropriate level, for example at a DIMM, rank or memory group level. Predictive gard records identify components, such as memory components, which have potential failures. This is a method where the existing memory remains in use until a time in the future when a control point may remove the memory from a system configuration based on the predictive failure. Memory redundancies may be performed at each level of memory, including DRAM, rank, memory group, and MBA.

A memory subsystem may have a connection with a processor, a memory buffer chip, a synchronous memory buffer (MBA) and two memory units or groups. The memory buffer chip may include a memory buffer, a cache and a memory controller. The memory buffer chip may include DIMMs. An example of a memory buffer chip is the IBM® Centaur. As an example, a memory group may contain 128 GB, which includes 8 DIMMs of 16 GB. A DIMM may include 16 DRAMs of 1 GB. Each DIMM may have several ranks, for example 8 ranks per DIMM, or 2 DRAMs per rank. In an example, the first DIMM may have ranks 1 to 8 of the memory subsystem, the second DIMM may have ranks 9 to 16 of the memory subsystem, and so on. When a failure is identified in one of the DRAMs, the firmware of the system may direct the corresponding rank to use the spare DRAM on the DIMM. If a second failure is identified on the DIMM, then the corresponding rank may be predictively garded by the firmware. Thus, the 2 DRAMS in the rank with the second failure will not be used, including the one bad or failing DRAM and one remaining DRAM without a failure. In an additional example, if the memory buffer chip has exhausted any spare DIMMs on the memory buffer chip and there is an additional failure, the memory buffer chip may be predictively garded.

Interleave mode is a design spreading memory addresses evenly across memory groups, and can be used to compensate when memory is slower than the processor in a system. For example, memory may be spread across two memory groups, with alternating sequential memory addresses in each of the two memory groups.

During runtime when an unrecoverable error is detected by diagnostic engines by the system firmware, the system firmware or hypervisor may request, via an advisory notification, to deallocate memory, or deconfigure memory, for memory groups on which the error occurred, via predictive gard records generated by the firmware. Predictive gard records may identify problem components, including memory with an error or failure. Predictively deconfigured memory units and memory interfaces are marked by the computer for removal from a computer configuration prior to the current initial program load. Due to the structure of the memory into ranks, DIMMs and memory groups, the system firmware or hypervisor may deallocate a large section of memory. The deconfigured memory may no longer be available for customer applications, which may decrease the performance of the machine. The deconfiguring of the memory may occur at a subsequent initial program load, reset, or may occur over time, as managed by the firmware or hypervisor and settings managed by the system administrator, or may be manually managed by the system administrator. The deconfiguring of the memory may be cached and over time the hypervisor 138 may evacuate a partition to isolate the failing component.

In an example, there may be a first memory group and a second memory group in interleave mode. The first memory group may have memory failures and the previously mentioned methods of addressing the failures have been exhausted or used. When an additional failure is identified, it cannot be corrected because there are no more spares or methods to address the failure. A substitute memory group may then be paired with the second memory group in interleave mode. Components of the first memory group which do not have failures identified may be deconfigured by association. For example, if the first memory group has 8 DIMMs, with 1 bad or failing DIMM and 7 DIMMs without a failure, the 7 DIMMs are deconfigured by association.

Memory mirroring is an additional method to improve RAS. Memory mirroring is a technique used to separate memory into two separate blocks, and each block has a copy of the same information to create redundancy. The block may be at the DIMM, rank, or memory buffer chip level, for example. The information is mirrored from the first block to the second block. Memory mirroring may be more costly than other methods to improve RAS and the use of memory mirroring may be limited, due to a double in the amount of memory needed. Memory mirroring has an advantage that is one block of memory has an error, the second block of memory have a complete copy of the information, such as a program, application, data, user data or the like. The granularity of memory mirroring may be a configurable policy.

Referring now to FIG. 1, a functional block diagram illustrating a control point 102 and a server computer 104 is shown, in accordance with an embodiment of the present invention.

The control point 102 may include a processor 108, a data storage device 110, an operating system 118 and memory 116. The control point 102 may include a computer interface, a screen and a keyboard. The computer interface may be used to interact with the control point 102. There may be a GUI (graphical user interface) on the computer interface. An error log can be stored in either the control point 102 or the server computer 104, or both, and may be copied one to the other such that both location have the current error log. A system administrator may use the computer interface to access the server computer 104, to retrieve information, control settings, programs, and the like. In various embodiments, the computer interface may be, for example, a laptop computer, tablet computer, netbook computer, personal computer (PC), a desktop computer, a personal digital assistant (PDA), a smart phone, a mobile device, or any programmable electronic device capable of communicating with the control point 102.

In an embodiment, the control point 102 may include any number of control points 102 and/or computer interfaces. The control point 102 may manage more than one server computer 104. It may be appreciated that FIG. 1 provides only an illustration of an implementation and does not imply any limitations with regard to the environments in which different embodiments may be implemented. Many modifications to the depicted environments may be made based on design and implementation requirements. The control point 102 manages the operations of the server computer 104, including starting and stopping virtual machines and configuring and de-configuring hardware including memory and processors. The operating system 118 may be loaded from the data storage device 110 into the memory 116 for execution.

There may be a communication network 106 between the control point 102 and the server computer 104. The communication network 106 may include wired connections, wireless connections, fiber optic connections, or some combination thereof. In general, the communication network 106 can be any combination of connections and protocols that will support communication between the control point 102 and the server computer 104. The communication network 106 may include various types of networks, such as, for example, a local area network (LAN), a wide area network (WAN) such as the Internet, a telecommunication network, a wireless network, a public switched network and/or a satellite network.

The server computer 104 may include a processor 112, memory 126 and a data storage device 114. As shown in the FIG. 2, levels 150 of the server computer 104 may include semiconductor technology 130, micro-architecture 132, systems and packaging 134, firmware 136, hypervisor 138, operating system 140, middleware/software 144 and solutions and services 146.

The semiconductor technology 130 may include electronic components. The micro-architecture 132 may include the processor 112, the memory 126, the data storage device 114, and DRAMs. The systems and packaging 134 may include multi-chip packaging and symmetric multiprocessing systems, such as DIMMs. The firmware 136 may include permanent software programmed into a read-only memory and provide control, monitoring and data manipulation of the systems and packaging 134, the micro-architecture 132 and the semiconductor technology 130. The hypervisor 138 may also be referred to a virtual machine monitor and may include software, firmware or hardware that create and run virtual machines. The firmware 136 and the hypervisor 138 allow the server computer 104 to work as if there are multiple computers on the system, each which can behave as a virtual machine. A virtual machine is an emulation of a computer system, which appears to be running an independent server computer. There may be one or more virtual machines on the server computer 104. The operating system 140 is a group of computer programs, device drivers and kernel that allow a system operator to work with the server computer 104. The middleware/software 144 are programs running on the server computer 104. The solutions and services 146 include applications on the server computer 104.

In an embodiment, selective mirroring may be implemented by the firmware 136. Alternatively selective mirroring may run on the hypervisor 138 or on both the hypervisor 138 and the firmware 136 of the server computer 104. Selective mirroring may be managed by a hardware management console (HMC), which is an application or program used to manage the server computer 104. An administrator may manually control selective mirroring via the HMC at the control point 102.

The granularity of selective mirroring using deallocated memory can be configured using a policy flag. The policy flag can be set by the administrator at the control point 102. Successful enablement and deployment of selective mirroring may not alter predictive gard records. The firmware 136, as described above regarding FIG. 1, may use a similar method for predictive memory errors during runtime. For example, after receiving a notification for a predictive memory error, the firmware 136 may notify the hypervisor 138 requesting an activation of selective mirroring. The hypervisor 138 or the firmware 136 may determine memory is not being used, and may then enable selective mirroring. In some cases, the request can be cached, and over time the hypervisor 138 may evacuate a partition to isolate the failing component, activate selective mirroring, and provide predictively garded memory to applications for use.

The selective mirroring program and associated methods are described and explained in further detail below with reference to FIGS. 2-3.

Figure 2:
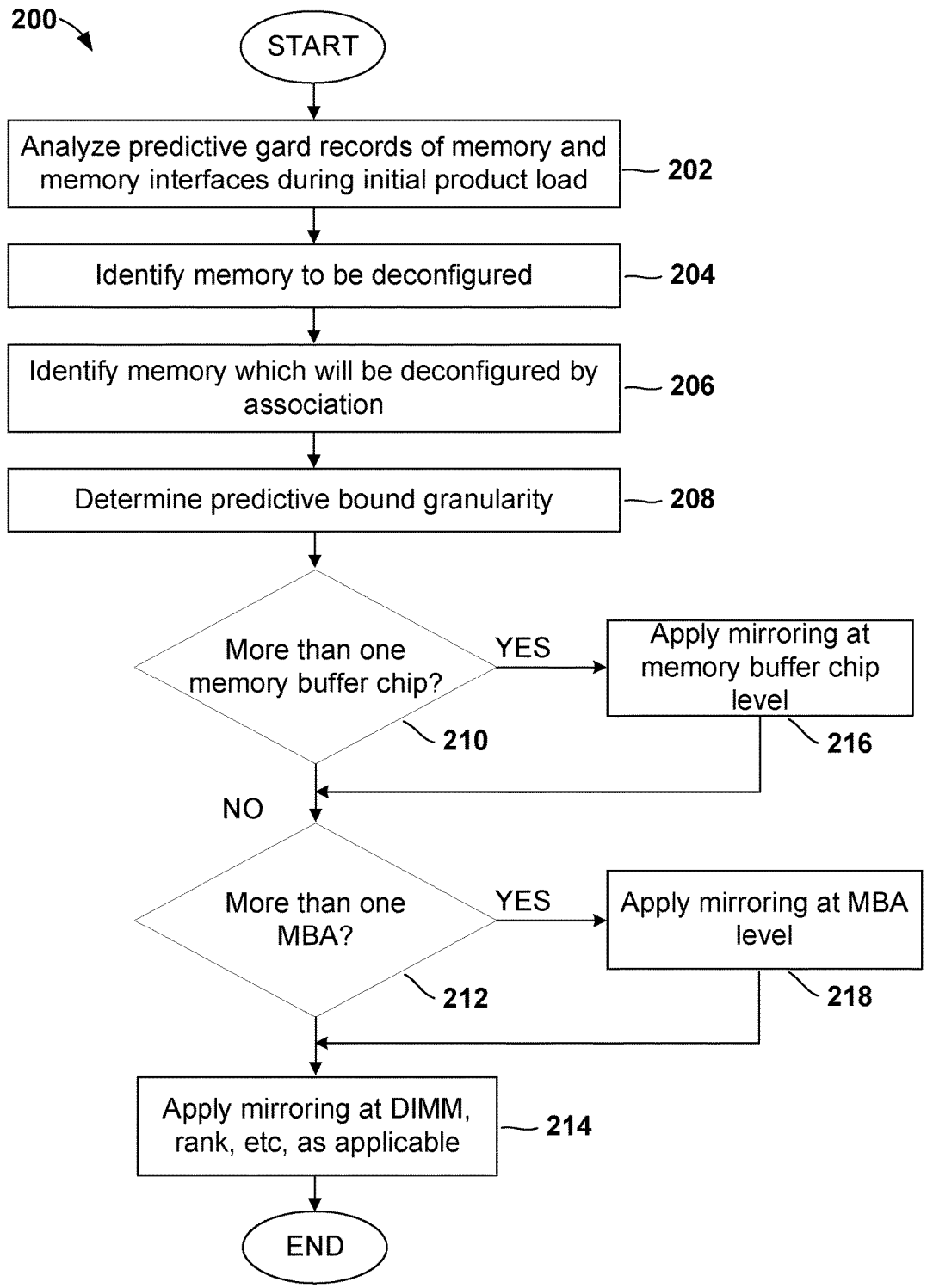
FIG. 2 is a flowchart depicting operational steps of selectively enabling mirroring within the environment of FIG. 1, in accordance with an embodiment of the present invention.

Referring now to FIG. 2, and with continued reference to FIG. 1, a simplified diagram of a selective mirroring flow (hereinafter referred to "flow") 200 is shown in accordance with an embodiment of the present invention. The flow 200 may be configured to perform selective mirroring on predictively isolated memory using predictive gard records by the firmware 136. The firmware 136 may use the flow 200 for an application which normally does not have redundancy or other methods of RAS. This may utilize memory which is not currently used and help to improve the RAS of the server computer 104. The ability to utilize unused memory in mirror mode may occur at various levels of the server computer 104, for example, levels which may include a memory buffer chip level, an MBA level, a memory unit or group level, a DIMM level, a rank level or a DRAM level, depending on a configuration of the server computer 104 and the predictive gard records. Predictively isolated memory may include memory which is deconfigured and are not being used by applications in the server computer 104, and are identified by predictive gard records. Predictively isolated memory also includes memory which is deconfigured by association due to the location of the predictively isolated memory devices and the structure of the memory, for example, memory buffer chip level, MBA level, memory unit or group level, DIMM level, rank level and DRAM level.

The firmware 136 may analyze predictive gard records of memory during an initial product load, may determine if memory mirroring can be used to provide improved reliability for a customer application at step 202.

Next, the firmware 136 may identify memory which is deconfigured, at step 204. Memory which is deconfigured is not being used and can be used for selective mirroring. The firmware 136 may identify memory which is deconfigured via the predictive gard records. Memory which is deconfigured may include memory buffer chips, MBAs, memory groups, DIMMs, ranks and DRAMs.

Then, the firmware 136 may identify memory which is deconfigured by association, at step 206. Memory which is deconfigured by association may include memory buffer chips, MBAs, memory groups, DIMMs, ranks and DRAMs. Memory which is deconfigured by association is memory which does not have a predictive gard record, but due to the configuration of the server computer 104 and the configuration of memory at each of the levels, memory buffer chip, MBA, memory group, DIMM, rank and DRAM levels, etc., the memory which is deconfigured by association is not being used. For example, predictive garded memory may be identified for a first memory buffer chip error, and the firmware 136 may check if the memory was working in an interleave mode, and may then configure the second memory buffer chip of the interleave mode in mirror mode to use as a backup for an application of the server computer 104, where the application does not normally have a backup. In this situation, the second memory buffer chip of the interleave mode does not have an error, and is not predictively garded, however due to interleave mode, the second memory buffer chip is not currently used. In a situation where the second memory buffer chip is available for selective mirroring, and there is a third memory buffer chip also available for selective mirroring, the second memory buffer chip and the third memory buffer chip may be grouped and configured in mirror mode. Similarly, if there are some predictive gard records for memory at other levels such as rank, DIMM, etc., the applicable memory can be configured in mirror mode. The granularity of mirroring for predictive error can be configured using a policy flag.

Then, the firmware 136 may determine predictive gard granularity, at step 208. Predictive gard granularity refers to the level of memory where selective mirroring may be run. A higher level of memory will provide a larger amount of storage available for an application or program to be stored using selective mirroring. For example, if there are two 128 GB memory groups available for memory mirroring, a program in size up to 128 GB may be stored in mirroring mode on the two 128 GB memory groups available for memory mirroring, due to the duplication of the program for improved reliability.

Next, the firmware 136 may check if the deconfigured memory and the memory deconfigured by association includes more than one memory buffer chip, at question diamond step 210.

If there is more than one memory buffer chip as a result of the question diamond at step 210, answer "YES", the firmware 136 proceeds to apply selective mirroring at the memory buffer chip level, at step 216. The selective mirroring flow 200 may be implemented by the firmware 136 using two of the available memory buffer chips. Next the firmware 136 proceeds to the question diamond step 212.

If the answer to the question diamond step 210 is "NO", and also after the step 216, the firmware 136 proceeds to determine if the identified memory groups to be deconfigured contain more than one MBA, as shown in question diamond step 212.

If there is more than one MBA found as a result of the question diamond step 212, the firmware 136 proceeds to apply selective mirroring using two of the available MBAs, at step 218. In this case, the firmware 136 may initiate selective mirroring at the MBA level, using two of the available MBAs.

If the answer to the question diamond step 212 is "NO", and also after the step 218, the firmware 136 proceeds to determine if there is more than one DIMM available for selective mirroring, and if so the firmware 136 may apply selective mirroring at the DIMM level, using two of the available DIMMs. Likewise, the firmware 136 may check the rank level and DRAM level, as applicable, at step 214, and apply selective mirroring at an appropriate memory level.

In a situation where a memory fail or error reoccurs on a mirrored memory buffer chip, MBA, DIMM, etc., in order to protect integrity of customer data, an unrecoverable error may be generated and no more attempt shall be made to reuse the mirrored memory buffer chip, MBA, DIMM, etc. with a reoccurring error.

The firmware 136 may use a similar approach for predictive callouts at runtime as well. After receiving a notification for a predictive error on memory, the firmware 136 may send a message to the hypervisor 138 requesting selective mirroring, in a case with the hypervisor 138 is managing the selective mirroring flow 200. The request may be advisory and not mandatory. If the memory with a predictive error is not being used, the hypervisor 138 may activate the selective mirroring flow 200 to be run by the firmware 136. Alternatively, the hypervisor 138 may cache the request and activate selective mirroring at a later time.

Similarly, the firmware 136 may enable the selective mirroring flow 200 during runtime. When the firmware 136 detects that it needs to predictively memory buffer chip memory, the firmware 136 may check other predictive gard records to identify other memory which is predictively garded. After analyzing memory which is predictively garded, the firmware 136 may enable mirror mode on selected memory, such as a rank, a DIMM or a memory group. The firmware 136 running the selective mirroring flow 200 may reduce future unscheduled incident repair actions in the case where additional errors are detected on the same memory group. The firmware 136 running the selective mirroring flow 200 may send a message to the hypervisor 138 requesting memory mirroring, in a case where the hypervisor 138 manages the selective mirroring flow 200. The hypervisor 138 may define its own criterion to consider the request.

The firmware 136 running the selective mirroring flow 200 may help to improve the RAS of the server computer 104 by utilization of memory which has been deconfigured and is now used for memory mirroring. Applications of the server computer 104 which normally do not have backup may now have memory mirroring to help reduce the likelihood of application failure. This will result in improved reliability of the server computer 104.

Figure 3:
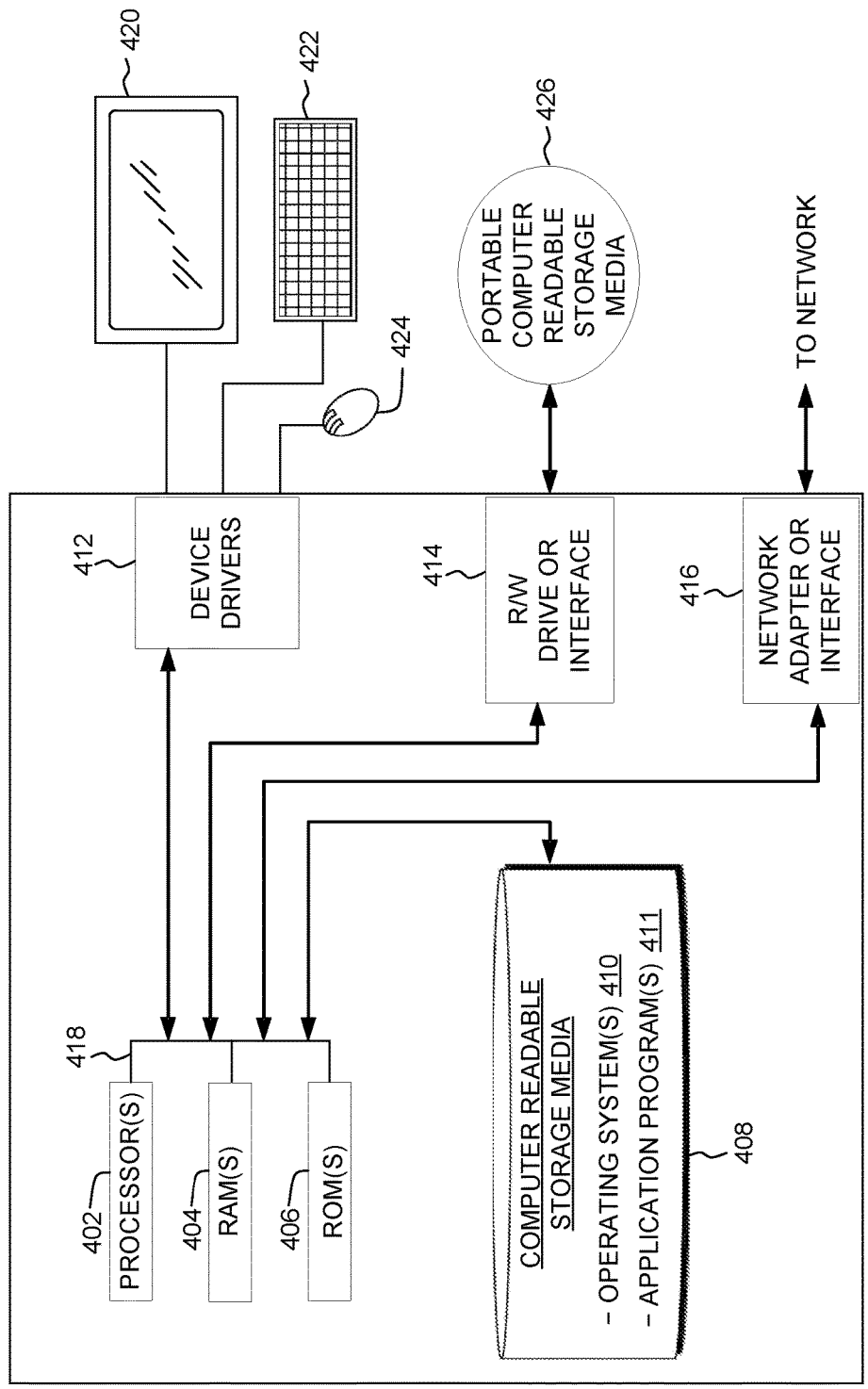
FIG. 3 is a functional block diagram of internal and external components of the control point and server computer depicted in FIG. 1, in accordance with an embodiment of the present invention.

Referring now to FIG. 3, a block diagram of components of a computing device, such as the server computer 104 of FIG. 1, in accordance with an embodiment of the present invention is shown. It should be appreciated that FIG. 3 provides only an illustration of an implementation and does not imply any limitations with regard to the environments in which different embodiments may be implemented. Many modifications to the depicted environment may be made.

The computing device may include one or more processors 402, one or more computer-readable RAMs 404, one or more computer-readable ROMs 406, one or more computer readable storage media 408, device drivers 412, read/write drive or interface 414, network adapter or interface 416, all interconnected over a communications fabric 418. Communications fabric 418 may be implemented with any architecture designed for passing data and/or control information between processors (such as microprocessors, communications and network processors, etc.), system memory, peripheral devices, and any other hardware components within a system.

One or more operating systems 410, and one or more application programs 411 are stored on one or more of the computer readable storage media 408 for execution by one or more of the processors 402 via one or more of the respective RAMs 404 (which typically include cache memory). For example, the selective mirroring flow 200, may be stored on the one or more of the computer readable storage media 408. In the illustrated embodiment, each of the computer readable storage media 408 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

The computing device may also include the R/W drive or interface 414 to read from and write to one or more portable computer readable storage media 426. Application programs 411 on the computing device may be stored on one or more of the portable computer readable storage media 426, read via the respective R/W drive or interface 414 and loaded into the respective computer readable storage media 408.

The computing device may also include the network adapter or interface 416, such as a TCP/IP adapter card or wireless communication adapter (such as a 4G wireless communication adapter using OFDMA technology). Application programs 411 may be downloaded to the computing device from an external computer or external storage device via a network (for example, the Internet, a local area network or other wide area network or wireless network) and network adapter or interface 416. From the network adapter or interface 416, the programs may be loaded onto computer readable storage media 408. The network may comprise copper wires, optical fibers, wireless transmission, routers, firewalls, switches, gateway computers and/or edge servers.

The computing device may also include a display screen 420, a keyboard or keypad 422, and a computer mouse or touchpad 424. Device drivers 412 interface to display screen 420 for imaging, to keyboard or keypad 422, to computer mouse or touchpad 424, and/or to display screen 420 for pressure sensing of alphanumeric character entry and user selections. The device drivers 412, R/W drive or interface 414 and network adapter or interface 416 may comprise hardware and software (stored on computer readable storage media 408 and/or ROM 406).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access a normalized search engine or related data available in the cloud. For example, the normalized search engine could execute on a computing system in the cloud and execute normalized searches. In such a case, the normalized search engine could normalize a corpus of information and store an index of the normalizations at a storage location in the cloud. Doing so allows a user to access this information from any computing system attached to a network connected to the cloud (e.g., the Internet).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for selective memory mirroring, the method comprising:
identifying, by a computer during an initial program load, predictively deconfigured memory units and memory interfaces, wherein the predictively deconfigured memory units and memory interfaces are marked by the computer for removal from a computer configuration prior to the initial program load;
analyzing the predictively deconfigured memory units and memory interfaces to determine a level of granularity for selective memory mirroring; and
initiating selective memory mirroring at the determined level of granularity using the analyzed predictively deconfigured memory units and memory interfaces, wherein the level of granularity includes a memory buffer chip level, an asynchronous buffer level, a memory group level, DIMM level, a rank level and a DRAM level, wherein the memory buffer chip level comprises a memory buffer, a cache and a memory controller and a DIMM, wherein determining a memory buffer chip level of granularity is available is based on more than one memory buffer chip being available in the predictively deconfigured memory and memory interfaces marked by the computer.

2. The method of claim 1, further comprising;
upon completing the initial program load, initiating selective memory mirroring during runtime, in response to the computer identifying and analyzing notifications of predictively deconfigured memory units and memory interfaces.

3. The method of claim 1, further comprising:
assigning to a program on the computer at least a portion of the analyzed predictively deconfigured memory units and memory interfaces, wherein the assigned portion of the analyzed predictively deconfigured memory units and memory interfaces provides a backup copy of data in memory to the program.

4. The method of claim 1, wherein the granularity of memory mirroring is a configurable policy.

5. A computer program product for selective memory mirroring, the computer program product comprising:
one or more computer-readable storage media and program instructions stored on the one or more computer-readable storage media, the program instructions comprising:
program instructions to identify during an initial program load, predictively deconfigured memory units and memory interfaces, wherein the predictively deconfigured memory units and memory interfaces are marked for removal from a computer configuration prior to the initial program load;
program instructions to analyze the predictively deconfigured memory units and memory interfaces to determine a level of granularity for selective memory mirroring; and
program instructions to initiate selective memory mirroring at the determined level of granularity using the analyzed predictively deconfigured memory units and memory interfaces, wherein the level of granularity comprises a memory buffer chip level, an asynchronous buffer level, a memory group level, DIMM level, a rank level and a DRAM level, wherein the memory buffer chip level comprises a memory buffer, a cache and a memory controller and a DIMM, wherein program instructions to determine a memory buffer chip level of granularity is available is based on more than one memory buffer chip being available in the predictively deconfigured memory and memory interfaces marked by the computer.

6. The computer program product of claim 5, further comprising:
program instructions to initiate selective memory mirroring during runtime, upon completing the initial program load, in response to the computer identifying and analyzing notifications of predictively deconfigured memory units and memory interfaces.

7. The computer program product of claim 5, further comprising:
program instructions to assign to a program on the computer at least a portion of the analyzed predictively deconfigured memory units and memory interfaces, wherein the assigned portion of the analyzed predictively deconfigured memory units and memory interfaces provides a backup copy of data in memory to the program.

8. The computer program product of claim 5, wherein the granularity of memory mirroring is a configurable policy.

9. A computer system for selective memory mirroring, the computer system comprising:
one or more computer processors, one or more computer-readable storage media, and program instructions stored on the one or more computer-readable storage media for execution by at least one of the one or more processors, the program instructions comprising:
program instructions to identify during an initial program load, predictively deconfigured memory units and memory interfaces, wherein the predictively deconfigured memory units and memory interfaces are marked for removal from a computer configuration prior to the initial program load;
program instructions to analyze the predictively deconfigured memory units and memory interfaces to determine a level of granularity for selective memory mirroring; and
program instructions to initiate selective memory mirroring at the determined level of granularity using the analyzed predictively deconfigured memory units and memory interfaces, wherein the level of granularity comprises a memory buffer chip level, an asynchronous buffer level, a memory group level, DIMM level, a rank level and a DRAM level, wherein the memory buffer chip level comprises a memory buffer, a cache and a memory controller and a DIMM, where program instructions to determine a memory buffer chip level of granularity is available is based on more than one memory buffer chip being available in the predictively deconfigured memory and memory interfaces marked by the computer.

10. The computer system of claim 9, further comprising:
program instructions to initiate selective memory mirroring during runtime, upon completing the initial program load, in response to the computer identifying and analyzing notifications of predictively deconfigured memory units and memory interfaces.

11. The computer system of claim 9, further comprising:
program instructions to assign to a program on the computer at least a portion of the analyzed predictively deconfigured memory units and memory interfaces, wherein the assigned portion of the analyzed predictively deconfigured memory units and memory interfaces provides a backup copy of data in memory to the program.

12. The computer system of claim 9, wherein the granularity of memory mirroring is a configurable policy.

* * * * *